July 12, 1938.   M. KADENACY   2,123,569
TWO-STROKE INTERNAL COMBUSTION ENGINE
Filed Jan. 11, 1937   3 Sheets-Sheet 1

M. Kadenacy
INVENTOR
By Glascock Downing Seebold
Attys.

Fig. 2

July 12, 1938. M. KADENACY 2,123,569
TWO-STROKE INTERNAL COMBUSTION ENGINE
Filed Jan. 11, 1937 3 Sheets-Sheet 3

Fig.3

M. Kadenacy
INVENTOR

By Glascock Downing & Seebold
Attys.

Patented July 12, 1938

2,123,569

UNITED STATES PATENT OFFICE 2,123,569

TWO-STROKE INTERNAL COMBUSTION ENGINE

Michel Kadenacy, Paris, France, assignor of one-half to Armstrong Whitworth Securities Company, Limited, Westminster, London, England Application January 11, 1937, Serial No. 120,118
In Great Britain January 11, 1936

1 Claim.  (Cl. 123—65)

This invention relates to two-stroke cycle internal combustion engines which operate in conformity with the natural phenomena accompanying the combustion and discharge of the gases, that is to say, to engines in which the high depression or vacuum occasioned as a consequence of the discharge of the burnt gases from the cylinder into the exhaust system as a coherent mass at a speed in excess of the speed of adiabatic expansion, by virtue of the energy contained in the gases while still in the cylinder, is utilized in charging the engine.

More particularly the invention relates to two-stroke cycle internal combustion engines, wherein the evacuation of the cylinder by the mass exit of the burnt gases is utilized in introducing the fresh charge by opening the inlet when the burnt gases are moving outwardly through the exhaust port or duct as a consequence of their mass exit from the cylinder.

The object of the invention is to provide a method of constructing such an engine, whereby an optimum and stable torque may be obtained, and additionally a constant torque over a desired speed range.

The invention consists in arranging that the area of exhaust orifice opened, within a sufficiently short interval of time to ensure that the gases then still in the cylinder retain sufficient ballistic energy to maintain a speed greater than the speed of adiabatic expansion during the subsequent evacuation of the cylinder, is greater than the product of the area of the engine piston multiplied by the instantaneous speed of adiabatic expansion for the medium considered and divided by the instantaneous speed of ballistic exit.

The area of exhaust defined in the above paragraph will hereinafter be referred to as the critical area of exhaust.

The invention further consists in arranging for an additional area of exhaust orifice to open after the said critical area has opened in order to ensure a more rapid evacuation of the burnt gases.

The invention still further consists in arranging for the said critical area to be opened within the required interval of time at the lowest engine speed.

The invention will be more clearly understood from the following description and by reference to the accompanying drawings, in which.

It has been the common belief that when the burnt gases are discharged from the cylinder of an internal combustion engine, the discharge of the burnt gases is in the nature of an adiabatic expansion and the speed of discharge of these gases is the speed of sound for the medium considered.

The applicant has already indicated in prior specifications that this assumption is not in accordance with fact, and that the behaviour of the burnt gases upon and after their discharge from the cylinder is such as to lead to the belief that the burnt gases, while still in the cylinder, form a body having properties similar to those of a resilient body, and which upon the opening of the exhaust orifice, seeks to project itself as a coherent mass from the cylinder.

They have observed that when the exhaust orifice opens there is first a period of delay, during which no appreciable change occurs in the gaseous medium external to the exhaust orifice and that after this delay has elapsed the burnt gases issue from the cylinder at a speed greatly in excess of the previously assumed speed of adiabatic expansion and as a coherent mass, the motion of which is governed by the laws of reflection and rebound.

This is in no way to be understood as excluding the expansion of the gases during their discharge from the cylinder. During this discharge the adiabatic expansion of the burnt gases occurs continuously but, on account of the fact that their speed of exit is greatly in excess of the speed of sound, the gases display consequent properties of cohesion so that they are capable of separating themselves from the walls of their containing vessel.

In order to give a clearer understanding of the phenomena under consideration and of the present invention, an analogy may be drawn by referring to the behaviour of a coil spring in reacting to impressed forces.

If a free helically coiled spring is placed on a table and is subjected to compression, the force of compression stored in the spring is a force acting on a mass and capable of imparting momentum to this mass. If the spring is then released so that it expands against a resistance, and the resistance is suitably chosen, the spring can be caused to expand slowly until it returns to its free length in which it will remain in a state of rest.

The work done by the spring in expanding will then have become stored in the resistance.

On the other hand, if the spring, after having been compressed on the table, is suddenly released, that is to say the compressing means are removed in a very small interval of time, the spring, while expanding as a consequence of its release, will also leave the table bodily. The energy stored in the spring has been utilized wholly in imparting momentum to the spring. During its flight through the air after it has left the table, oscillations will occur in the continuous medium constituting the spring, but these oscillations will bear no direct relationship with the motion of the spring bodily from the table.

This condition may be compared with the exit of the burnt gases from the cylinder at a speed higher than the speed of adiabatic expansion.

Again, if while the spring is held in a static state of compression between two surfaces it is subjected to an impact, for example a hammer blow, the action exerted on the spring by the hammer blow will manifest itself in two forms. In the first place it will increase the compression of the spring and in the second place it will cause motion of the centre of gravity of the spring, since it is a force acting on a mass and capable of producing an acceleration of this mass.

If one of the retaining walls is then removed in such a short interval of time that this motion of the centre of gravity of the spring still continues, the spring will rebound bodily from the other wall with a speed which is increased as a consequence of the velocity imparted to its centre of gravity by the hammer blow.

The hammer blow imparted to the spring may be compared with the impact exerted on the compressed gases in an engine cylinder by the combustion of these gases, and it will be seen that the suggestion that is being made is that this combustion, in addition to increasing the pressure of the gases, may also impart velocity to the centre of gravity of the mass of gases in the cylinder, and that the speed of exit of the burnt gases when the exhaust orifice is opened is influenced by this possible pre-existing velocity in the cylinder.

From the above explanation it will be seen that in the applicant's view the burnt gases which are discharged from the cylinder of an internal combustion engine have a mechanical elasticity which can be compared with that of a spring and that it is the time element that determines whether the gases will leave the cylinder by a flow set up by adiabatic expansion or as a body projected by applied force.

The adiabatic expansion of gases may be compared with the condition under which the expansion of the spring is exerted upon an opposed resistance. The mass exit of the burnt gases from the cylinder may be compared with the condition under which the major part of the energy stored in the spring is transformed into motion of the mass of the spring.

When the burnt gases leave the cylinder through the exhaust orifice, their velocity, since it is greatly in excess of the speed of sound for the medium considered, may be considered to be the consequence of two factors, (1) an adiabatic flow having a velocity equal to the speed of sound, and (2) a force capable of imparting to the gases a velocity greatly in excess of the speed of sound. This force will hereinafter be referred to as the ballistic force and the velocity which is a consequence of this force will be called the ballistic speed of the burnt gases.

Under the action of the first of these factors the gases are only capable of expanding as a continuous medium maintaining contact with all parts of the walls of the containing vessel, and until a pressure equilibrium is reached between the cylinder and the external atmosphere.

Under the action of the second of these factors, since the centre of gravity of the mass of burnt gases is moved at a speed in excess of the speed of sound, the mass of burnt gases is capable of separating itself from its containing walls.

In considering the analogy between the burnt gases in an engine cylinder and the compressed spring, it must however be borne in mind that in the engine the burnt gases are discharged from the cylinder through an orifice which is always smaller than the area of cross section of the cylinder and which is opened gradually and not instantaneously. The release of the gaseous spring formed by the burnt gases is thereby resisted and the greater this resistance the less will be the energy that is transformed into momentum of the mass of the gaseous spring.

If we consider that the burnt gases have arrived in the exhaust duct and are passing outwardly through the latter at their instantaneous ballistic speed, and neglect expansion, then on account of the difference in area between the exhaust orifice and the area of the engine cylinder, the centre of gravity of the portion of the burnt gases remaining in the cylinder will adopt a resultant movement towards the outlet at a slower speed than that of the portion of the burnt gases contained in the exhaust duct and the ratio between these two speeds will be determined by the ratio between the area of exhaust orifice open at this moment and the area of cross section of the cylinder.

But since the whole mass of burnt gases is expanding continuously at its speed of adiabatic expansion, the speed of exit of the portion of the burnt gases contained in the cylinder at any moment will be reduced by the speed of this expansion.

Expressed in other words, the increment of volume by expansion occurring in the cylinder in any interval of time, is deducted from the effective reduction in volume of the cylinder content by escape through the exhaust orifice in this same interval of time.

It will therefore be seen that according to the predominance of one or the other of the two factors mentioned above, at the end of the discharge of the burnt gases as a consequence of both of these actions, the cylinder space will either be full of gases at atmospheric pressure in an inert state, or it will contain gases in a rarefied state, or this space will be completely void of burnt gases.

Figures 1, 5:
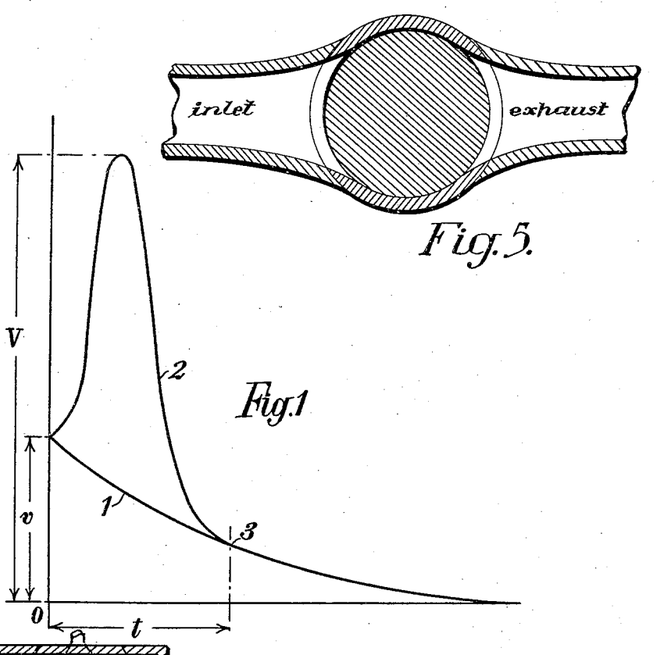
Figure 1 is an explanatory diagram relating to the velocity of exit of the burnt gases upon their discharge from the cylinder through the exhaust orifice.
Fig. 5 is a section at right angles through Fig. 4 on the line 5—5.

It is now proposed to analyze these three conditions with reference to Figure 1 of the accompanying drawings.

This figure shows two velocity curves, on a time base, the ordinates representing velocities.

The point 0 represents the moment at which the exhaust orifice commences to open.

The curve 1 represents the changes in velocity that occur in a gas which is expanding from a high pressure to a low pressure, and when a purely adiabatic flow has been established.

The ordinate $v$ represents the maximum velocity which will be obtained when the pressure difference is greatest (that is to say, at the moment when the exhaust orifice opens), and it will be seen that this velocity falls gradually as the time interval increases, until it eventually reaches zero.

Such a curve may be established by calculations based on considerations well known in the art, and is an imaginary curve of what is assumed to occur when a gas is expanded from a high pressure to a low pressure.

The applicant has observed that the changes in velocity that occur initially as a consequence of the opening of an orifice for the release of the compressed burnt gases in an internal combustion engine are not those represented by the curve 1. On the contrary, with a certain delay the velocity of exit rises rapidly to a speed greatly in excess of the maximum velocity of adiabatic expansion. If the duration of exit is prolonged, this high speed of exit then falls and eventually becomes identified with the adiabatic speed.

This initial high or ballistic speed manifests itself as a consequence of the opening of an exhaust orifice, irrespective of the size of this orifice, but evidently the volume of gases discharged at this initial ballistic velocity, which exists for only a very short interval of time after the burnt gases have commenced to leave the cylinder, will depend upon the magnitude of the orifice.

These conditions are represented by the curve 2 in Figure 1.

It will be seen that in this case the velocity rises rapidly to a peak value V which is greater than the maximum velocity of the curve 1 and subsequently falls first rapidly and then at a decreasing rate until it finally merges with the curve 1 at the point 3 in a time $t$ which will be hereinafter referred to as the critical time.

Following the analogy of the spring, it may be imagined that the curve 1 represents the variations in rate of expansion that occur when the compression of the spring is released so gradually that the reaction exerted by the table against which the spring is compressed is absorbed by doing work on another medium than on the spring, and no propelling action on the spring occurs. In the case of the curve 2 the higher ordinate V may be considered to be due to the propelling action arising either solely from the compression of the spring at this moment or from this action in combination with the pre-existing velocity of the centre of gravity of the spring produced by the hammer blow, that is, by the combustion of the charge. In this case the gaseous spring upon its release will be subjected to an acceleration which is represented by the initial rise in the curve 2 and after a period of time $t$ when the energy of propulsion is dissipated any further motion of the centre of gravity can only be produced by simple adiabatic expansion, the curve 2 will become tangential with the curve 1 at the point 3. In the curve 2 the initial velocity has been take as $v$ but it may be higher or lower than this value since if the hammer blow is taken into consideration as producing a pre-existing velocity of the burnt gases in the cylinder, then at the moment the exhaust orifice opens, the burnt gases may be moving towards or away from the orifice at this pre-existing high velocity.

It will be seen from the above that at the end of the interval of time $t$ the velocity of the burnt gases which can be caused by all the factors that have any influence on the velocity of the gases has fallen to such a low level that it becomes equal to the velocity that can be produced solely by a simple adiabatic flow.

At this moment it may be said that the speed of exit of the burnt gases becomes the speed of adiabatic expansion of the burnt gases, which is effective in all directions, so that at any moment thereafter the burnt gases will completely fill the space in which they are accommodated. In an engine of the kind to which the invention relates the discharge of the whole or a substantial portion of the burnt gases occurs in that part of the curve 2 which lies to the left of the point 3.

If the burnt gases have left the cylinder of the engine through an orifice and in such a way that at the end of the time $t$ the pressure in the cylinder is above atmospheric pressure, then thereafter the burnt gases will simply expand adiabatically until a pressure balance has been reached between the cylinder and the external ambient medium.

When an exhaust system is fitted the equalization of pressure will be established between the medium in the cylinder and the medium in the exhaust system, but the exhaust system is under the influence of the gases that have left ballistically and account must be taken of this action upon the interior of the cylinder in the following moments.

If, however, the exhaust orifice is opened and in a time interval shorter than $t$ and at the ballistic speed of exit of the gases a pressure balance is reached, then thereafter, since the burnt gases are still propelled outwards at their ballistic speed, a depression will be created in the cylinder. This is a second case.

In this case also a controlling action may be obtained by the use of a suitably designed exhaust duct, whereby the depression in the cylinder may be intensified and its duration prolonged by the action of the burnt gases which have left the cylinder ballistically.

Further, if in an interval of time less than $t$, the area of exhaust orifice opened is greater than the area of the engine piston multiplied by the instantaneous speed of adiabatic expansion and divided by the instantaneous speed of ballistic exit, then, at this moment, the expansion of the tail end of the burnt gases contained in the cylinder will no longer be a predominant factor, and this tail end of the burnt gases will detach itself from that portion of the cylinder most remote from the exhaust orifice and a complete void will be left behind the burnt gases in the cylinder. This is a third case.

The shorter the interval of time in which this critical area is opened, the less the expansion of the burnt gases that will have occurred in this time interval, and consequently the more compact will be the tail end of the burnt gases, and the more ballistic energy will remain in the burnt gases, so that the volume of complete void that will be left behind the tail end of the burnt gases will be the greatest.

For the ballistic speed of exhaust a value of from 1400 to 1800 metres/sec. may be assumed, according to the quality of the combustion and the degree of compression. These figures relate to fuel oil, of the kind commonly employed in compression ignition engines and will vary with the type of fuel employed. For petrol, the figures will be somewhat higher.

For the speed of adiabatic expansion, figures of 350 to 450 metres/sec. may be assumed, so that if the higher figure is taken in each case, the critical area of exhaust orifice will be $450/1800$ or $\frac{1}{4}$ the cross sectional area of the engine cylinder.

For the critical time $t$ the value $\frac{1}{300}$ sec. may be assumed, since the applicant has found that it is in the neighbourhood of this time interval that a very satisfactory utilization of the ballistic phenomena is obtained for the purpose of the present invention.

Figure 2:
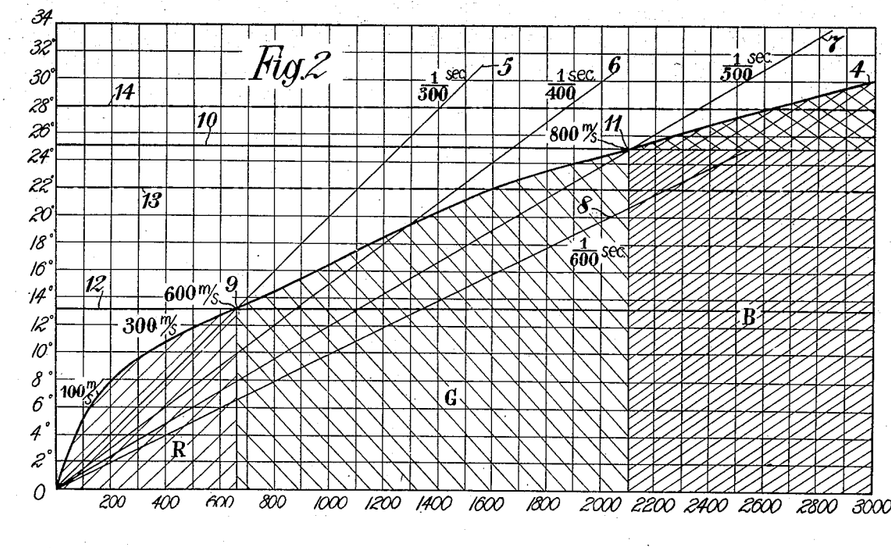
Figure 2 is a diagram illustrating the different conditions obtained in the cylinder of an internal combustion engine as a consequence of the discharge of the burnt gases and showing the effect of a retarded opening of the critical area.
Figure 3:
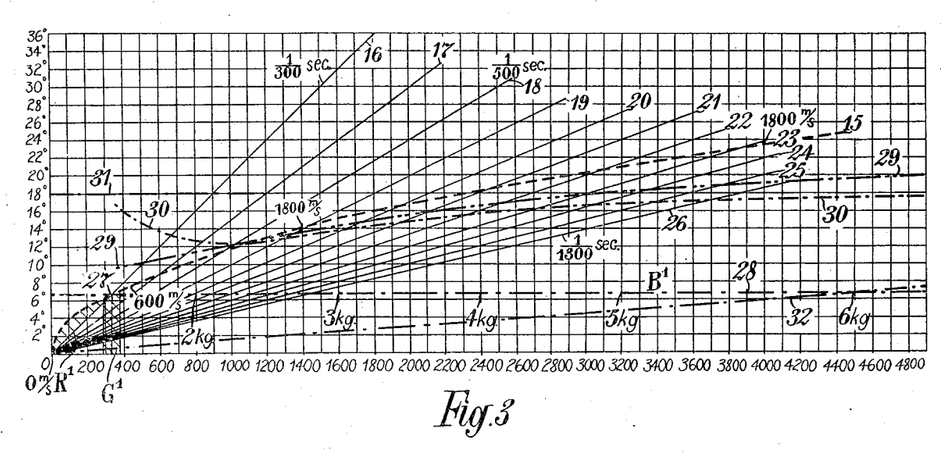
Figure 3 is a similar diagram to Figure 2, but showing the effect of an earlier opening of the critical area.
Figure 4:
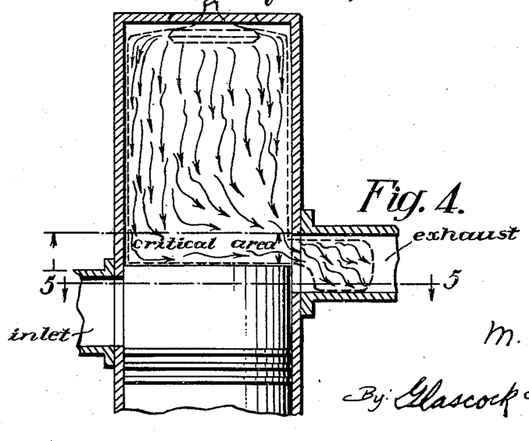
Fig. 4 is a central section through the cylinder showing the inlet and exhaust.

The manner in which the above considerations may be applied in the construction of an engine will appear from the following and with reference to Figures 2 and 3, but it must be understood throughout the present specification that where numerical values are assumed for the adiabatic or ballistic speeds of the burnt gases and for the critical area of exhaust and for the critical time interval referred to above, these values are practical values which have been obtained as a result of experience and that although they suffice for establishing an engine in accordance with the invention, they are not necessarily exact values.

As a first method of calculation it may be assumed that at the moment of opening of exhaust the gases in the cylinder are at a pressure of 5 atmospheres, and that 4 cylinder volumes of burnt gases must be discharged to restore an instantaneous and figurative pressure balance between the interior of the cylinder and the atmosphere external to the exhaust orifice, these 4 volumes being discharged at the ballistic speed of 1,800 metres/sec. On the basis of these considerations a curve can be constructed, the points on which denote the crank angle at which this pressure equilibrium is reached at varying engine speeds. On such a curve, when these 4 volumes have been discharged in a time less than the critical time $t$, the end of exhaust will occur at the ballistic speed of the burnt gases.

As an alternative method of approximate calculation, the applicant has found that in engines of the kind to which the invention relates, a hypothetical speed of 450 metres per second may be applied to the exit of one cylinder volume of burnt gases, neglecting expansion but including the delay period that elapses before the burnt gases commence to leave the cylinder. The time interval that will be required to discharge the burnt gases from the cylinder can be calculated from a consideration of the mean area of opening of the exhaust orifice.

Either of the above methods of calculation will give the same result, but the curve shown in Figure 2 is obtained by the second of these methods.

In this figure the ordinates represent degrees of crank movement starting from the opening of exhaust which is marked by the point 0 and the abscissae represent revolutions per minute of the engine.

The curve 04 indicates the angular interval at which the burnt gases have been discharged from the cylinder at the different speeds of revolution of the engine, in so far as the action within the cylinder is concerned. This curve is obtained as follows:

Assuming the volume of the cylinder to be represented by W the angular interval between the opening of the exhaust and any chosen point on the crank angle by $a$ the mean area of exhaust orifice opened in this crank angle by A, then the length of the column formed by the issuing mass of burnt gases will be $$\frac{W}{A}$$

the time interval that will be occupied for the mass of burnt gases to travel this distance past the exhaust orifice at 450 metres/sec. will be $$\frac{W}{A} \times \frac{1}{450}$$

It is then necessary to determine the engine speed at which in the chosen number of degrees of crank angle the mean area of exhaust orifice in question has been opened in the above mentioned time interval, and this will enable points on the curve to be obtained for each selected angular interval after exhaust opening has commenced.

Polar co-ordinates representing constant time intervals elapsing after the opening of exhaust at varying engine speeds are then drawn from the point 0, the lines 05, 06, 07, 08 representing respectively $\frac{1}{300}$ sec., $\frac{1}{400}$ sec., $\frac{1}{500}$ sec., $\frac{1}{600}$ sec.

If a vertical ordinate is drawn at the point 9 at which the curve 04 intersects the line 05, it will be seen that this ordinate, in the example chosen, corresponds with a speed of approximately 660 R. P. M.

At all speeds higher than 660 R. P. M., in the area marked G, it may be assumed that the burnt gases are discharged from the cylinder in an interval of time less than $\frac{1}{300}$ sec., and consequently that the cylinder is left in a rarefied condition or is completely void of gases.

At all speeds under 660 R. P. M., it will be seen that the burnt gases are discharged in an interval of time which is greater than $\frac{1}{300}$ sec., so that in the area below the curve 04 marked by the reference letter R, the end of the exhaust occurs at speeds progressively approaching those of adiabatic expansion only, leading eventually, at some unspecified lower speed to an equalization of pressures between the cylinder and the external atmosphere.

A horizontal line is then drawn in the diagram to represent the crank angle at which the critical area of exhaust orifice is opened. It will be seen that this line which is designated by the numeral 10 in the drawings intersects the curve 04 at the point 11 which corresponds with a speed of 2,100 R. P. M. At all higher speeds than 2,100 R. P. M., in the area marked B, the critical area of exhaust orifice has been opened in an interval of time sufficiently smaller than $\frac{1}{300}$ sec. to ensure that after this critical area has been opened the speed of the burnt gases then contained in the cylinder, in the direction of outlet, will be sufficiently greater than the speed of adiabatic expansion so that the tail end of the gases then in the cylinder will constitute what may be considered to be an imaginary gaseous piston which detaches itself from the end of the cylinder, leaving a complete void behind it.

It should be clearly understood that the tail end of the burnt gases at this moment may be in either a rarefied or compressed state and that this will depend upon the time interval.

At the point 11 the tail end of the burnt gases will be highly rarefied, but thereafter as the speed increases the imaginary gaseous piston will be more and more highly compressed, while still detaching itself from the cylinder head, since the interval of time that has elapsed before the critical area has opened becomes shorter, and the amount of expansion of the burnt gases that can have occurred is also smaller.

In addition as the speed of the engine increases after the point 11, the quantity of burnt gases that has left the cylinder at its ballistic speed before the critical area of exhaust is opened will be smaller so that the energy contained in the burnt gases remaining in the cylinder when the critical area of exhaust is opened will be greater.

In the engine under consideration it will be now assumed that inlet is timed to open at 13° after exhaust opens, the opening of inlet being represented by the horizontal line 12.

It will be seen that this line passes through the point 9 which is at the intersection of the curve 04 with the line 05 representing $\frac{1}{300}$ sec.

In this engine, therefore, at speeds less than 660 R. P. M., at the end of the exhaust operation the residual gases in the cylinder have been left in a progressively less rarefied condition by the discharge of the burnt gases at their ballistic speed.

At speeds higher than 660 R. P. M., at the end of the exhaust operation the cylinder has been left in a progressively more highly rarefied condition by the discharge of the burnt gases at their ballistic speed, but at all these higher speeds of the engine, inlet is opened too soon to permit a good utilization of this depression or rarefaction.

If the timing of inlet opening is then altered in order to permit a good utilization of the depression left in the cylinder by the mass exit of the burnt gases as set forth in British specification No. 431,856 and in other specifications in the name of the present applicant, for example so that the interval between exhaust opening and inlet opening is 22° on the line 13, then at 1,600 R. P. M., the engine will be capable of operating by drawing its charge directly from the atmosphere and it will give its maximum torque at this speed although this will not be the optimum possible torque for this engine.

At higher speeds than 1,600 R. P. M., inlet will open too soon and the torque will fall off rapidly.

Below 1,600 R. P. M. the crank angle between the discharge of the burnt gases from the cylinder and the opening of inlet increases and in addition the depression left in the cylinder decreases so that eventually the torque again falls off.

If the angular interval between exhaust opening and inlet opening is further increased to 28° on the line 14, then at 2,600 R. P. M. the critical area of exhaust has been opened in an interval of time considerably smaller than $\frac{1}{300}$ sec., and before the ballistic speed of the burnt gases has become non-existent. Consequently the imaginary gaseous piston will separate itself from the cylinder, and the cylinder will be completely evacuated and capable of receiving a full charge by atmospheric pressure under the best possible conditions.

It will then be seen that the range of working speeds at which the engine can operate with a fixed timing of inlet and by drawing its charge directly from the atmosphere has been considerably increased and that at its highest speed range the conditions of operation will be such as to permit an optimum torque to be obtained.

By way of example only, numerals indicating the velocity of the burnt gases have been placed at different points on the curve 04 in order to indicate the manner in which the velocity at the instantaneous end of exhaust increases as the interval of time occupied by the discharge of the burnt gases decreases.

It will be appreciated from a consideration of Figure 2 and the above description that the most desirable conditions for the engine will be those in which the critical area is opened in the smallest possible crank interval after the opening of exhaust and in which this critical area of exhaust orifice is opened within the critical time interval at the lowest engine speed.

Such a condition is illustrated in Figure 3.

This figure is similar to Figure 2 in respect of the showing of the curve 015 and the polar coordinates 016 to 026 representing constant time intervals.

In this example it is assumed that it is desired that at all speeds above 600 R. P. M. the cylinder shall be left completely void as a consequence of the discharge of the burnt gases at their ballistic speed, that is to say, that the imaginary gaseous piston will always separate itself from the cylinder head and will thereafter move continuously out of the cylinder.

In order to obtain such a condition, the engine is so arranged that the critical area of exhaust orifice is opened within the critical interval of time at a speed lower than 600 R. P. M. In the example the critical area is opened within an interval of $\frac{1}{300}$ sec. at 350 R. P. M., the critical area being opened in 7° of crank movement after the opening of the exhaust. This pre-supposes a larger periphery of the exhaust orifice and has the effect of flattening the curve 015.

This will have the effect of reducing the range of speeds over which the area G of the curve (Figure 2) extends and in which the cylinder is left in a rarefied condition, but not completely void.

The distance between the points 9 and 11 may in fact be so reduced by suitably situating the critical area of exhaust orifice that the portion G of the curve, for all practical purposes, may be considered to be nonexistent, and so that the engine operates throughout its whole speed range under the best possible conditions, with the cylinder completely empty of burnt gases at the end of the discharge of the latter.

In Figure 3 the line 016 representing the critical time of $\frac{1}{300}$ sec. intersects the curve 015 at the point 27 and the line 28 representing the critical area of exhaust orifice also intersects the curve 015 at the point 27.

In the portion $R_1$ of the curve 015 to the left of the point 27, the cylinder, at the end of the discharge of the burnt gases therefrom, and neglecting the action in the exhaust system of the portion of the gases which has left the cylinder ballistically, remains full of gases at atmospheric pressure while to the right of the point 27, in the part $B_1$, the imaginary gaseous piston always separates itself from the end of the cylinder. But for the sake of accuracy, since the intermediate condition cannot be made to disappear wholly, a narrow portion $G_1$ of the curve is shown overlapping the point 27.

It should be understood clearly that the curve 015 is an imaginary curve, and gives no indication of where the burnt gases are situated at the assumed end of the discharge, or when the four cylinder volumes have been discharged.

The portion of the curve 015 which is of interest in establishing the timing of inlet opening, is that part which lies to the right of the point 27 on the 1/300 sec. line, since it is in this part of the curve that the imaginary gaseous piston separates itself from the end of the cylinder.

As stated above, when the critical area of exhaust orifice has been opened, the imaginary gaseous piston will commence to separate itself from the cylinder head. At this moment a certain quantity of the burnt gases has already been discharged from the cylinder, but the volume of the cylinder remains fully occupied by burnt gases.

It may, therefore, be assumed that after this moment one cylinder volume of burnt gases has to be discharged through the exhaust orifice at a mean speed of 1,800 metres per second, the mean area of the exhaust orifice through which this exit occurs being measured from the moment when the critical area is opened until the moment when the tail end of the burnt gases leaves the cylinder.

In order to establish the moment when the evacuation of the cylinder is completed over this part of the curve 015 a further calculation may be applied in the following manner.

Such a calculation should take into consideration the expansion of the burnt gases during their ballistic exit from the cylinder, and the crank angles and mean areas of exhaust orifice to be considered must be measured from the crank angle at which the critical area of exhaust opens.

For each chosen crank angle after the opening of the critical area of exhaust, the mean area of exhaust open during the interval in question may be determined, and it is clear that these mean areas will always be greater than the critical area.

For practical purposes the mean speed of ballistic exit in the exhaust pipe may be assumed to be 1,800 metres/second, and the mean speed of adiabatic expansion 450 metres/second. If these values are taken, the calculation may be carried out as follows:

If $A_p$ is the area of cross section of the cylinder $A_c$ is the critical area of exhaust orifice. (In the example and according to the invention this will be greater than $$\frac{A_p \times 450}{1800}$$

$A_x$ is the area of exhaust orifice opened at the chosen crank angle.

Then the mean area of exhaust orifice $A_m$ equals $(A_x + A_c) \times$ a time/area factor say ½.

The speed of outward movement of the volume of gases in the cylinder will be $$\frac{A_m}{A_p} \times 1800$$

which will be greater than 450 metres/second.

Since the gases are expanding backwards at 450 metres/sec., the resultant speed of discharge of the cylinder contents will be $$\left(\frac{A_m}{A_p} \cdot 1800\right) - 450 \text{ metres/sec.}$$

From the length of the stroke the time interval occupied to evacuate the cylinder completely at this resultant speed of exit can be determined, and from this time interval the engine speed at which the mean area of exhaust in question has been opened can be determined.

A calculation carried out in this way will give a curve such as the curve 29 which denotes the moments when the cylinder has been left completely void.

It will be seen that at the lower speeds this curve becomes situated above the curve 015 and that at higher speeds it becomes situated below this curve.

This curve 29 is subject to correction since it is established on the assumption of a constant ballistic speed of exit of the burnt gases after the critical area has been opened and a constant speed of adiabatic expansion.

If it had been derived from the instantaneous values of these speeds the curve would have adopted the form of the curve 30.

In this connection it should be observed that at low engine speeds, say at 800 R. P. M., a greater proportion of the burnt gases has left the cylinder before the critical area of exhaust orifice has opened than at high speeds, say 4,000 R. P. M.

Consequently, at low speeds the smaller mass of the volume of burnt gases filling the cylinder at the moment the critical area of exhaust is opened will be less dense and will contain less ballistic energy. Its subsequent speed of exit will be lower, and it will travel a shorter distance from the cylinder after the total evacuation has occurred.

In the limiting case the gaseous piston will move a certain distance down the cylinder and will thereafter become stationary, and will remain in the cylinder. When this condition arises, it will be clearly understood that the gases in the cylinder are nevertheless in a highly rarefied state and expansion immediately becomes the dominant factor, resulting in refilling of the void with rarefied gases unless the inlet is opened at this moment.

At the higher speeds the volume of burnt gases filling the cylinder when the critical area of exhaust has opened is more dense and compact, the amount of ballistic energy retained in the cylinder at this moment is greater and the ballistic speed of exit of the remaining burnt gases is higher so that the time occupied for the subsequent evacuation of the cylinder will be smaller.

By way of example, velocities of exit of the burnt gases are indicated on the curve 015 which may be considered in conjunction with the above remarks in considering the form of the curves 29 and 30. In addition at different points on the line 28 an indication is given of the pressure of the gases contained in the cylinder at the moment the critical area of exhaust has opened. This indication of pressures is intended to show that as the engine speed increases the pressure of the gases remaining in the cylinder at the moment the critical area of exhaust is opened becomes greater and greater, as explained above.

It will be seen that the curve 30 is higher than the curve 29 at lower engine speeds and that thereafter it falls a little below the curve 29 and that from 1,000 R. P. M., to 4,800 R. P. M., the ordinates of this curve 30 only increase by 6°.

Consequently in such an engine, if inlet is timed to open at 18° after exhaust opens on the line 31, over the whole speed range of the engine, this timing of inlet opening will remain suitable for the introduction of the fresh charge into a completely void cylinder.

At the highest speed inlet opening is very close to the moment when the void is left in the cylinder and at lower speeds there is never more than an interval of 6° between the occurrence of the void and the opening of inlet.

This reasoning is independent of the position of the exhaust orifice but such a timing will be necessary in the case of an engine in which both the inlet and exhaust ports are situated at the same end of the cylinder, for example, an engine having inlet and exhaust ports both operated by the same piston.

If the exhaust and inlet orifices are at the opposite ends of the cylinder, then inlet may be opened, strictly speaking, immediately the imaginary gaseous piston becomes separated from the end of the cylinder at which the inlet orifice is situated, so that it will be possible in such an engine to establish a fixed timing of inlet such that inlet opens immediately the critical area of exhaust orifice has been opened.

In the example considered this would be at 7° after exhaust opens. In practice, however, some latitude will have to be allowed and a suitable fixed timing of inlet opening could be established for such an engine at say 12°.

In the foregoing description only brief mention has been made of the period of delay that elapses before the burnt gases commence to leave the cylinder at their ballistic speed. It will be understood, however, that consideration of this delay is subordinated to that of the critical area of exhaust opening; but in order to make the description more clearly understood, the line 32 is included in Figure 3 to show the general situation of the delay that elapses before the burnt gases commence to move outwardly through the exhaust orifice or duct as a consequence of their mass exit from the cylinder. It will be understood that this mass exit commences at the end of the delay period in question, and that thereafter if the critical area of exhaust orifice is opened in a sufficiently short interval of time, the tail end of the issuing gaseous mass separates itself from the end of the cylinder with which it is in contact. It can also be imagined that at some very high speed of the engine, the critical area of exhaust will be opened in such a short interval of time that the burnt gases have not yet been able to commence their mass exit from the cylinder and such a condition is represented purely by way of example by the intersection of the line 32 with the critical area line in Figure 3 at 4,500 R. P. M.

In carrying out the present invention, it should be noted that the requirement is that the critical area of exhaust orifice shall be opened within the critical time interval, and this imposes the condition that the design of the engine must permit this result to be obtained and that the devices selected must be those which are capable of permitting the conditions to be fulfilled.

In applying the invention to any particular engine, this may involve radical alterations in design, including the design of the exhaust orifice controlling means and the exhaust orifices themselves.

For example, it may be necessary to provide a ring of exhaust ports all round the cylinder, and this will involve the use of two or more exhaust pipes since there must be no surfaces which oppose the exit of the burnt gases from the cylinder or which tend to reflect those gases back into the cylinder.

In general the requirements of the invention may be fulfilled irrespective of whether the stroke of the cylinder is relatively long or short, but since an increase in length of stroke relative to the bore will increase piston speeds, such a design will more easily permit the desired rapid openings of the exhaust orifices to be obtained.

Moreover, an increase in length of stroke will have the effect of increasing the critical time $t$.

In addition, the longer the stroke relative to the bore, the smaller will be the proportion of the cylinder volume of burnt gases that can be discharged from the cylinder before the critical area of exhaust has opened, and consequently the greater the ease with which the imaginary gaseous piston can be made to separate itself from the cylinder end at low engine speeds.

It should also be borne in mind that any exhaust ducts that are placed in continuation of the exhaust orifice will exert a controlling action on the issuing mass of burnt gases.

Further, it is desirable that after the critical area of exhaust orifice has been opened the necessary additional area of orifice should be opened to facilitate the escape of the burnt gases from the cylinder, since in this way the mean area of exhaust orifice is increased and the time interval occupied for the discharge of the imaginary gaseous piston will be reduced.

By means of the invention, conditions are established whereby an optimum torque and stability of the engine may be obtained over a desired speed range, and any suitable means described in the applicant's British or prior British specifications may be utilized in order to permit such a result to be obtained.

The invention has a particularly useful application to engines of the kind wherein the exhaust orifice closes later than the inlet orifice, such as engines in which both the inlet and exhaust orifices are situated at the same end of the cylinder and are controlled by the same piston.

By the use of the present invention, such an engine can be established in which as a consequence of the discharge of the burnt gases, a completely void cylinder is ensured.

Thereafter, by a suitable design of exhaust duct it will be possible to ensure that in the neighbourhood of the highest working speeds the return of the burnt gases is made to coincide substantially with the closure of inlet and in the interval between inlet closure and exhaust closure, and at all lower speeds the contents of the cylinder are protected from the return of the burnt gases which will then occur before inlet closes, whereby fresh gases which have passed through the cylinder into the exhaust system will be returned to the cylinder and may give a supercharge. Means capable of establishing such a protection against the return of the burnt gases have already been described by the applicant in prior specifications Serial Nos. 738,016 and 83,120, while in applications Nos. 38,826 and 46,805 the influence of the design of the exhaust duct upon the interval elapsing between the mass exit and the return of the burnt gases has been explained.

It has been stated above, that where numerical values are given in order to enable the present invention to be carried into effect, these values are practical values which are suitable for adoption. But in considering all these values, and the details of the curves shown in the figures it is again emphasized that these curves do not pretend to be accurate record of all the factors that can be considered to be involved, but are practical representations which can be used as a guide in carrying out the invention.

I claim:

A two-stroke internal combustion engine wherein the evacuation of the cylinder by the mass exit of the burnt gases is utilized for introducing a fresh charge, which comprises an exhaust orifice in the cylinder and means for opening and closing said orifice, the shape, dimensions and position on the cylinder of said orifice and the means for opening said orifice being so constructed and arranged that a sufficient area of said orifice is opened at such a rate at substantially the minimum working speed of the engine that the ballistic speed of exhaust is maintained for substantially the whole of the burnt gases throughout the evacuation of the cylinder at said minimum speed, whereby the above condition will be maintained at all higher working speeds.

M. KADENACY.